March 12, 1935.    J. WEATHERBY    1,994,119
LIQUID HEATER
Filed Oct. 5, 1932
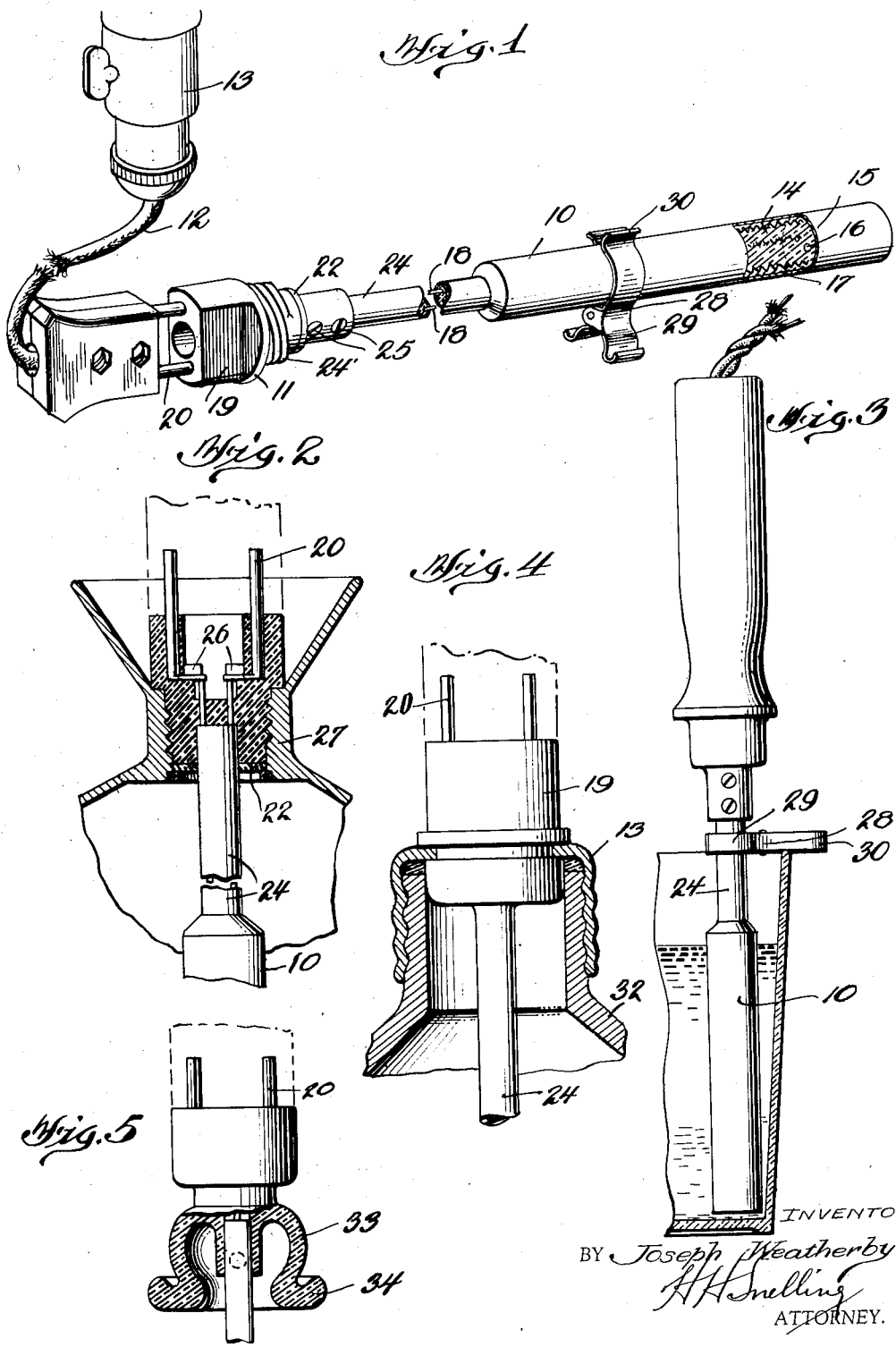
INVENTOR
BY Joseph Weatherby
H H Snelling
ATTORNEY.

UNITED STATES PATENT OFFICE 1,994,119

LIQUID HEATER

Joseph Weatherby, Harrisburg, Pa.

Application October 5, 1932, Serial No. 636,395

2 Claims. (Cl. 219—41)

This invention relates to liquid heaters of the immersion type and particularly to the small domestic heaters used for warming small amounts of water, milk or other liquids.

A particular object of the invention is to provide a heater of this type in combination with the closure for a vessel containing the liquid to be heated for example, with a stopper for a hot water bottle or in combination with a cap for a nursing bottle.

Another object of the invention is to provide a cordless liquid heater in combination with a plug connection fixed directly to the handle of the heater whereby the cord may be detached and put out of the way as soon as the liquid is heated and heater left in the liquid to conserve the heat which would otherwise be lost if the heater were removed. This modification is not necessarily provided with a vessel closure of any kind.

A further object of the invention is to provide a clip which serves two functions, first to clip on the hot end of the heater when it is taken from the liquid to prevent it from engaging and burning the supporting surface and, secondly to clip on the heater near the handle and acts as a hook whereby the heater may be suspended on the rim of a vessel and is kept out of contact with the walls and the bottom.

A still further object of the invention is to provide a domestic liquid heater of a new and attractive design and one which may be used for all kinds of liquid heating such as boiling eggs, making tea and coffee, etc. This heater consists of an elongated cylindrical body having a relatively small neck on which is attached the handle.

The above objects of my invention may each be carried out independently or with one or any combination thereof or with other objects which will appear in the specification and claims.

During the past several years there have appeared on the market numerous electrical devices for heating water or other liquids in small quantities as needed. These devices have been an especial boon to the traveling public who require at least a small amount of warm water for washing, shaving or other toilet needs but who often find themselves in hotels and trains where hot water is not available but where there is almost always available an electrical outlet where various appliances may be connected. A great disadvantage of the liquid heaters now on the market is that the heater is permanently connected to a long awkward cord which is necessarily in the way even when the heater is disconnected from the circuit. I overcome this disadvantage by providing a connector directly on the heater so that the heater may be left in the vessel after the current is cut off and the cord can be packed away at once or used for some other appliance.

Another disadvantage which I avoid by my invention is that experienced in heating water for hot water bottles. In the past it has been necessary to heat water in a separate container, then pour this into the bottle and when traveling it often happens that only a small vessel such as a drinking glass is available thus making it necessary to heat several small amounts of water before the hot water bottle is sufficiently full. This entails repeated opening and closing of the bottle and the rather troublesome process of pouring the hot liquid from the glass into the bottle which often results in much of the water being spilled and sometimes the fingers are severely burned. And incidentally as much or more heat is wasted than actually gets into the bottle. All these disadvantages are avoided by my invention and with the assurance that every bit of the heat is generated within the bottle. It is only necessary to fill the bottle the required amount, insert my improved heater, screw down the connector stopper, connect the connector end to an appliance cord, complete the circuit and wait until the water is as warm as desired. Then merely disconnect the cord from the connector-stopper and the bottle is ready for use. This avoids all danger of burns, spilling the water and incidentally saves all the heat and furthermore requires but half as much time as do the old devices.

In order to make my device universally useful I provide an improved dual clip by which my heater may be either supported from the rim of a vessel in which the liquid is to be heated or may serve as a support when the heater is removed from the liquid as the clip is provided with a large clasp at one end for engaging the heater element and with a small clasp at the other end for engaging the neck of the device. When clasping the neck the clip serves as a hook and when clasping the element it serves as a support, the ends of the small clasp being bent to form feet.

Not only is my invention intended for heating liquid in hot water bottles but a very important use is in heating milk in nursing bottles for infants. The modification for accomplishing this purpose differs from the hot water bottle heater in that the plug or connector is attached to a cap that fits over the mouth of the nursing bottle in much the same manner as a nipple. Thus during the heating process there is no danger of spilling the milk which often happens in the old type heaters when ever any one knocks against the connector cord.

In the drawing:

Figure 1 shows the device partly in section.

Figure 2 shows the device screwed into a hot water bottle.

Figure 3 shows a modification of the device in use in heating liquid in a vessel.

Figure 4 shows still another modification particularly adapted for use in heating liquid in nursing bottles and vessels of that type.

Figure 5 is a partly sectional view of my invention as applied to a closure of the screw cap type.

The general combination is shown in Figure 1 in which the heater 10 is provided with a combination stopper-connector 11, fitted into the plug on the end of an appliance cord 12 which cord is attached to the usual socket 13. As will be seen the heater consists of a body 14 composed of porcelain or other electrical insulating and heat conducting material which is enclosed in a metal shell 15. A plurality of bores 16 are provided in the insulator body and within these bores are fitted the spirally wound heating elements 17 which are connected to the plug 11 by means of the conductors 18. This heating element is of a well known construction and is not claimed per se in this specification.

One modification of my connector-stopper 11 preferably consists of a well known type of connector 19 at one end having prongs 20 and of a standard stopper 24' at the other end for screwing into the ordinary hot water bottle. This stopper may be provided with the usual washer 22 for preventing leakage. The stopper differs from the usual construction in that it is provided with a central bore for receiving the neck 24 of the heater 10. The connector-stopper preferably, but not necessarily, is an integral molding and may be provided with screws 25 or some other means for securing it to the neck of the liquid heater. It is also provided with contacts 26 by which the conductors 18 may be connected to the prongs 20 for completing the circuit thru coils 17 of the heater.

As mentioned above the principal object of the invention is to provide a unitary means for heating the contents of and sealing a hot water bottle and I have illustrated this in Figure 2. It will be seen that the heater may be screwed into the bottle for heating the contents and then the plug may be disconnected from the usual cord without the necessity of removing the stopper from the water bottle 27.

When the device is used for heating liquid in a glass or other vessel my improved clip 28 is secured by its small end 29 to the neck of the heater and the large end 30 is preferably allowed to project over the rim of the glass. The clip is also used for supporting the heater after it is removed from the liquid as shown in Figure 1, the large prongs 30 clasping the end 10 and the small prongs 29 serving as feet for the support.

In Figure 4 is illustrated a connector-cap in combination with the heater. This is quite similar to the hot water bottle device differing therefrom in that instead of being associated with a stopper the connector 19 is part of a bottle cap 31 adapted to be screwed on the mouth of a bottle 32. In Figure 5 I have shown a heater connector particularly adapted for use on nursing bottles. In this modification the cap 33 is like the lower part of a nipple being of soft rubber and having a bead 34 for firmly engaging the neck of the bottle. The engagement need not be so firm as required for nipples but should be at least sufficient to support a filled bottle when lifted by the heater cord so that the heater cannot be accidentally pulled from the bottle.

The new design of my general purpose heater with my improved element 10 and the attractive handle is brought out in Figure 3 in which is also shown my improved clip as used in supporting the heater when heating liquid in a vessel.

In the modification of my device adapted especially for hot water bottles I provide a heater element of relatively low capacity so that the bottle may first be filled with hot water and then sealed with my device. When the circuit is completed I find that heat is generated about as fast as it is dissipated thru the walls of the bottle so that a substantially constant temperature is maintained.

What I claim is:

1. In an electrical heater adapted to heat small quantities of liquid, a heating element adapted to pass thru the neck of an ordinary nursing bottle, a cap-like closure for said bottle adapted to cover the mouth of the bottle and having a resilient bead at its lower edge adapted to make fluid tight engagement with the neck of said bottle, a connector for said heating element, said connector and said closure constituting an integral unit fixed to said element whereby the contents of a bottle may be heated and the bottle sealed by means of said heater.

2. The device of claim 1 in which the closure is substantially cup shaped and is composed of soft rubber whereby when slipped over the mouth of a nursing bottle the rubber rim makes fluid tight engagement with the neck of the bottle.

JOSEPH WEATHERBY.